United States Patent
Bhattacharjya

[11] Patent Number: 5,809,213
[45] Date of Patent: Sep. 15, 1998

[54] AUTOMATIC COLOR CALIBRATION OF A COLOR REPRODUCTION SYSTEM

[75] Inventor: Anoop K. Bhattacharjya, Sunnyvale, Calif.

[73] Assignee: Seiko Epson Corporation, Tokyo, Japan

[21] Appl. No.: 678,884

[22] Filed: Jul. 12, 1996

Related U.S. Application Data

[60] Provisional application No. 60/012,186, Feb. 23, 1996.

[51] Int. Cl.⁶ ..................................................... H04N 1/46
[52] U.S. Cl. ......................... 395/106; 395/109; 358/504; 358/523
[58] Field of Search .................................. 395/106, 109, 395/131; 358/504, 523, 518, 525

[56] References Cited

U.S. PATENT DOCUMENTS

| | | | |
|---|---|---|---|
| 4,379,292 | 4/1983 | Minato et al. | 345/154 |
| 4,500,919 | 2/1985 | Schreiber | 358/518 |
| 4,653,112 | 3/1987 | Ouimette | 382/128 |
| 4,721,951 | 1/1988 | Holler | 345/154 |
| 4,843,573 | 6/1989 | Taylor et al. | 395/131 |
| 4,875,032 | 10/1989 | McManus et al. | 345/154 |
| 4,897,799 | 1/1990 | Le Gall et al. | 364/514 A |
| 4,929,978 | 5/1990 | Kanamori et al. | 358/520 |
| 4,941,038 | 7/1990 | Walowit | 358/518 |
| 4,959,669 | 9/1990 | Haneda et al. | 347/115 |
| 4,985,853 | 1/1991 | Taylor et al. | 395/131 |
| 5,121,196 | 6/1992 | Hung | 358/504 |
| 5,150,199 | 9/1992 | Shoemaker et al. | 348/180 |
| 5,162,899 | 11/1992 | Naka et al. | 358/518 |
| 5,200,817 | 4/1993 | Birnbaum | 358/518 |
| 5,225,901 | 7/1993 | Kishida | 358/518 |
| 5,239,370 | 8/1993 | Yamaguchi | 358/518 |
| 5,243,414 | 9/1993 | Dalrymple et al. | 358/500 |
| 5,257,097 | 10/1993 | Pineau et al. | 358/500 |
| 5,293,258 | 3/1994 | Dattilo | 358/518 |
| 5,305,119 | 4/1994 | Rolleston et al. | 358/522 |
| 5,309,257 | 5/1994 | Bonino et al. | 358/504 |
| 5,381,246 | 1/1995 | Suzuki et al. | 358/500 |
| 5,381,349 | 1/1995 | Winter et al. | 364/526 |
| 5,392,390 | 2/1995 | Crozier | 395/161 |
| 5,398,121 | 3/1995 | Kowalewski et al. | 358/504 |
| 5,416,613 | 5/1995 | Rolleston et al. | 358/504 |
| 5,471,324 | 11/1995 | Rolleston | 358/518 |
| 5,483,360 | 1/1996 | Rolleston et al. | 358/518 |
| 5,489,998 | 2/1996 | Yamada et al. | 358/523 |
| 5,491,568 | 2/1996 | Wan | 358/518 |

*Primary Examiner*—Edward L. Coles, Sr.
*Assistant Examiner*—Fan Lee

[57] ABSTRACT

A method and apparatus for automatic color correction is described. The method and apparatus implemented technique in which a nonlinear interpolation technique is applied to a relatively small number of measured sample values generated from color image patches to provide a color lookup table having a larger number of calibration values stored therein.

15 Claims, 8 Drawing Sheets

AUTOMATIC COLOR CALIBRATION OF A COLOR REPRODUCTION SYSTEM

RELATED APPLICATIONS

This application claims priority benefit of U.S. Provisional Application Ser. No. 60/012,186, filed Feb. 23, 1996.

FIELD OF THE INVENTION

This invention relates generally to color reproduction systems and more particularly to methods and apparatus for color correction in color reproduction systems.

BACKGROUND OF THE INVENTION

As is known in the art, there are a variety of processor controlled systems which provide color images on a medium such as paper or film. Digital color reproduction systems such as color facsimile systems, digital color copiers and the like each include a scanner for scanning a color image to produce scanner color signals representing the color image, a digital image processor for processing the scanner color signals to produce printer color signals, and a printer for reproducing the color image.

As is also known there is a trend to provide personal computers (PCs) which include scanners and other devices for color-image input such as digital cameras. A PC having color peripheral devices such as color scanners and color printers coupled thereto may thus operate as a digital color reproduction system.

Several of the more prevalent color peripheral devices include scanners such as hand held and page scanners, printers such as ink-jet, laser dye sublimation and photolithography printers and plotters such a electrostatic and drum/flatbed plotters. Each of these devices may be coupled to or interfaced with a processor which processes color information which is scanned, printed or plotted.

Each color peripheral device such as a color scanner or a color printer uses a device-dependent color-coordinate system to specify colors. These coordinates are often specified in some color space that naturally maps the color coordinates to the color-generation mechanism of the device. The term color space refers to an N- dimensional space in which each point in the space corresponds to a color. For example, an RGB color space refers to a three-dimensional device color space in which each point in the color space is formed by additive amounts of red (R), green (G) and blue (B) colorants. Color monitors, TV screens and scanners typically operate in RGB color space. In a color monitor or TV screen, for example, red, green and blue fluorescent pigments are used to provide a particular color.

Another example is the CMYK color space which is complementary to the RGB color space. Each point in the CMYK color space corresponds to a color formed using combinations of cyan (C), magenta (M), yellow (Y) and black (K) color dyes or pigments. Printers using ink normally operate in CMYK color space in which particular amounts of the ink colorants are combined to form a particular color on a medium such as paper, film or the like. Other color spaces related to various color devices are also well-known in the art.

A device color gamut or more simply a color gamut refers to a range of colors producible within a color space by a particular device from a set of colorants. Thus, the color gamut of a particular device corresponds to a particular region of the visible colors that can be produced by the device.

For example, a printer color gamut $G_p$ corresponds to the set of all colors which can be printed by a particular type of printer. The printer color gamut $G_p$ is determined by a variety of factors including but not limited to properties of the paper, ink, dye, number of dots per inch (for ink jet printers), halftoning methods, device drivers etc . . . .

Similarly, a scanner color gamut $G_s$ corresponds to the set of colors which can be detected by a scanner. The scanner color gamut $G_s$ is determined by a variety of factors including but not limited to the spectral response of a scanning sensor, spectral characteristics of the color filters used to extract color values for a given color input, spectral characteristics of the illuminant, etc . . . .

A scanner having a scanner color gamut $G_s$ may be coupled to a printer having a printer color gamut $G_p$. Typically, some of the colors in the scanner color gamut $G_s$ are not included in the printer color gamut $G_p$ and vice-versa.

Let $\Omega_s$ and $\Omega_p$ denote the complete space of device color coordinates for the scanner and printer respectively. For example, if the scanner generates 24-bit RGB data, the scanner space $\Omega_s$ consists of 16,777,216 color coordinates. Let the space of all possible color spectra be denoted by, $\Omega_c$. A printer implements a set function, $\phi_p: \Omega_p \to \Omega_c$, that maps the set of printer coordinates to a set of printable colors. Similarly, a scanner implements a set function, $\phi_s: \Omega_c \to \Omega_s$, that maps colors to the scanner color coordinates space. Using these functions, the scanner color coordinate space can be partitioned into two sets. The first set is composed of those colors that can, in principle, be reproduced on the printer. This set is called the set of in-gamut colors and is denoted, $C_{IN}$. The set $C_{IN}$ is defined as the composition of two set functions, $$C_{IN} = \phi_s \cdot \phi_p(\Omega_p)$$

The remaining set of colors is the set of colors that may be scanned by the scanner but cannot be printed by the printer. This set of colors is called the out-of gamut colors and is denoted, $C_{OUT}$. The set $C_{OUT}$ is defined as, $$C_{OUT} = \Omega_s - C_{IN}$$

Since the colors belonging to the set $C_{OUT}$ cannot be printed by the printer, we can only hope to find printable colors that may serve as good approximations.

To allow the printer to print a color in response to a color signal fed thereto from the scanner, the scanner color signals which represent colors outside the printer color gamut are converted or mapped to an available color within the printer color gamut. Thus, when the scanner provides a color signal which represents a color outside the printer color gamut, the scanner color signal is mapped to a point inside the printer color gamut.

It has been recognized in color studies that people are relatively sensitive to changes in hue and brightness. Thus, the scanner color signal is mapped to a point inside the printer color gamut which is closest in hue and brightness to the original color as represented by the scanner color signal.

In theory the set of colors included in both the scanner color gamut $G_s$ and the printer color gamut $G_p$, i.e. the set $C_{IN}$, can be reproduced exactly. In practice, however, even when colors included in both the scanner and printer color gamuts are scanned and then printed, the colors in the printed image are different from the colors in the scanned image. Thus, each color has a device dependency due to unique device responses to input signals fed thereto.

The colors produced by two different devices in response to the same input signal differ due, at least in part to distortion of the signals which occur due to nonlinear response characteristics of circuit components which make up the devices and the manner in which a particular color within a device color gamut is selected in response to the input signal. Thus, a given input signal representing a particular color provided to two different devices (e.g. two different printers, a printer and a scanner, etc . . .) typically results in the devices physically producing two different colors even when the input signal represents a color included in the color gamuts of both of the devices. This device characteristic is referred to as device color-dependency.

In order to provide a color reproduction system which provides reproduced colors which match original colors as closely as possible, a transform is employed in a digital image processor which maps the scanner color signals, to the printer color signals so that the color reproduction system faithfully reproduces the colors present in the original images. Often the transform is implemented by employing a three dimensional lookup table (LUT).

The process of deriving such a transform and generating the lookup table is called system color calibration. If the transform is derived for a particular scanner-printer combination, the system is referred to as a closed system and the process is called closed system color calibration, which is a special case of system color calibration.

One approach commonly used to calibrate a color reproduction system which includes a color scanner coupled through a processor to a color printer includes two steps. The first step is to derive a first color transform $f_s$ to convert the scanner color signals such as RGB signals into color signals in a device independent color space (DICS). The second step is to derive a second transform $f_p$ to convert color signals from the DICS to printer color signals such as CMYK signals.

The two transforms $f_s$ and $f_p$ may then be combined into one function $f_c$ implemented by the processor which converts scanner color signals into printer color signals directly. The transform $f_c$ is commonly implemented by storing calibration values in a three or four-dimensional LUT and using a linear interpolation method to interpolate between values in the lookup table.

Calibrating a color reproduction system in this way involves generating a set of color patches on the printer, measuring the color patches using an optical instrument such as a spectroradiometer and using a mathematical method such as regression to derive the transform $f_p$ based on the measured data. The calibration continues by scanning a set of test patterns, measuring the test patterns using an optical instrument such as spectroradiometer and employing a mathematical method such as regression to then derive the transform $f_s$ based on the scanned data. Calibrating a system in such a way is relatively difficult and time consuming and cannot easily be accomplished automatically.

To minimize the time required to calibrate, a relatively small number of sample points are measured and stored in the lookup table. Thus, the lookup table is relatively sparse and a three-dimensional interpolation is used to compute values between the values stored in the lookup table. One technique referred to as a tetrahedral interpolation provides a relatively rapid method for approximating three-dimensional functions from a sparse set of sample points. One problem with this approach, however, is that tetrahedral interpolation is a linear interpolation method which is relatively inaccurate in approximating nonlinear functions. Since the function $f_c$ is typically a nonlinear function, the tetrahedral interpolation method requires a relatively large set of sample points to provide a relatively close approximation to the actual function $f_c$. The generation of a large set of sample points entails a large number of measurements which is time consuming and often expensive in terms of ink and paper consumption, for example, and thus is generally undesirable.

For smooth functions, nonlinear interpolation methods provide a more accurate estimate than linear functions when fewer sample points are used. Nonlinear interpolation techniques, however, are computationally expensive and time consuming.

Another approach to map colors between scanner and printer color gamuts is to model the printers, the printer characteristics, the scanner and the scanner characteristics. However, due to the complexities and number of nonlinearities in the scanner and printer such approaches typically do not provide satisfactory results.

Still another prior art approach is to uniformly sample a cube in the printer color space. For example, an RGB cube in the printer color space may be uniformly sampled along the R, G and B axis to provide a discrete set of printer color coordinates which are stored in a memory of a computer. These color coordinates are provided to a printer which prints color patches corresponding to the specified color coordinates.

The printed color patches are subsequently fed to a scanner and scanned to provide a set of scanner color coordinates that is a subset of the entire space of color coordinates of the scanner. Thus, a direct correspondence is obtained between the set of stored printer color coordinates and the set of scanned color coordinates.

With this approach, for each point that is printed there is a corresponding point that is scanned. This correspondence can be used to provide a desired color. One problem with this approach is that it is relatively difficult, time consuming and computationally intensive to compute the inverse function that maps all the scanner color coordinates to printer color coordinates.

It would therefore be desirable to provide a color reproduction system which provides reproduced colors which match original colors. It would also be desirable to provide a technique for providing a computationally efficient technique for approximating colors belonging to both a scanner color gamut and a printer color gamut. It would also be desirable to provide a color reproduction calibration technique which does not require a relatively large set of sample points requiring a large number of measurements. It would further be desirable to provide a color calibration technique which is not computationally expensive. It would be still further desirable to provide a technique for efficiently printing a color which is included in both a scanner color gamut and a printer color gamut. It would also be desirable to provide a system which allows color matching to be performed between a scanner and a printer without the use of photometric equipment such as a spectrophotometer.

SUMMARY OF THE INVENTION

In accordance with the present invention, a method for calibrating a color reproduction system includes the steps of generating a first set of sample points, performing a nonlinear interpolation between the sample points to generate an augmented set of sample points and using the augmented set of sample points to construct and store a table of values in the computer's memory. This table is used to map scanner color coordinates to printer color coordinates. With this particular arrangement, a relatively rapid and accurate method for calibrating a color reproduction system is provided. The step of generating the first set of sample points may include the step of uniformly sampling a cube in a color space at a first resolution and printing a set of color patches having colors represented by the sample points. The printed color patches are subsequently scanned by a scanner. In one embodiment, the sampling points are selected from the axis of a color space in which the color cube exists. The nonlinear interpolation method used to compute values between the sample points may be provided in a three-dimensional color space by cubic B-splines or by using a combination of three one-dimensional cubic splines. Since a relatively large number of data points which can be used in a lookup table are generated without printing a large number of patches, the method allows relatively rapid and accurate color calibration of a scanner and/or a printer coupled to a computer system. It should be noted that in some systems the scanner may be directly coupled to the printer. Thus the technique of the present invention accommodates color calibration of any combination of scanner and printer coupled to a processor which may be either external to both the scanner and printer or internal to one of the scanner or printer. Furthermore, a function which fits the sample points provided by the nonlinear interpolation may be computed and optimized such that differences between color values predicted by the function and actual color values are minimized. In this manner the lookup table values generated via an iterative optimization and nonlinear interpolation scheme are relatively close to the values which could otherwise be provided by physically scanning in patches having the corresponding colors.

In accordance with a further aspect of the present invention, an apparatus for calibrating a color reproduction system includes a first sampler to sample a first color space. The sample values provided by this sampler may correspond to uniformly sampled points of a cube in the first color space. Hard copies of the colors corresponding to the sampled coordinates in the first color space are input to a color-input device to generate corresponding color coordinates in a second color space. A first interpolator interpolates between the measured samples to provide an augmented set of sample values. This interpolator is a nonlinear interpolator. The augmented set of sample values is used to construct a mapping from the second color space to the first color space. The mapping is stored in a computer's memory as a lookup table that is used by a fast interpolator to map any color coordinate in the second color space to a coordinate in the first color space. With this particular arrangement, an apparatus for generating calibration values for a color reproduction system is provided.

In accordance with a still further aspect of the present invention, a method for generating a lookup table includes the steps of identifying a first plurality of sample points, generating an augmented set of sample points using a nonlinear interpolation function, transforming predetermined ones of the first plurality of sample points from a first color space to a second color space, transforming the predetermined ones of the first plurality of sample points from the second color space back to the first color space and minimizing an error value between a supplemental sample point generated using the nonlinear interpolation function and a corresponding one of the predetermined ones of the first plurality of sample points. With this particular arrangement, a method for generating a color lookup table for use in a color reproduction calibration scheme is provided. By minimizing the error between the supplemental sample points and the measured sample points, the difference between a desired color value and a predicted color value is also minimized. In one embodiment in which the values are pre-stored in a memory, the nonlinear interpolation method is implemented as a cubic B-spline interpolation. In another embodiment in which the calibration is performed by a user, the nonlinear interpolation technique is implemented as a combination of three one-dimensional cubic splines. The nonlinear interpolation generates the supplemental data values from data values sampled from a scanner color gamut.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
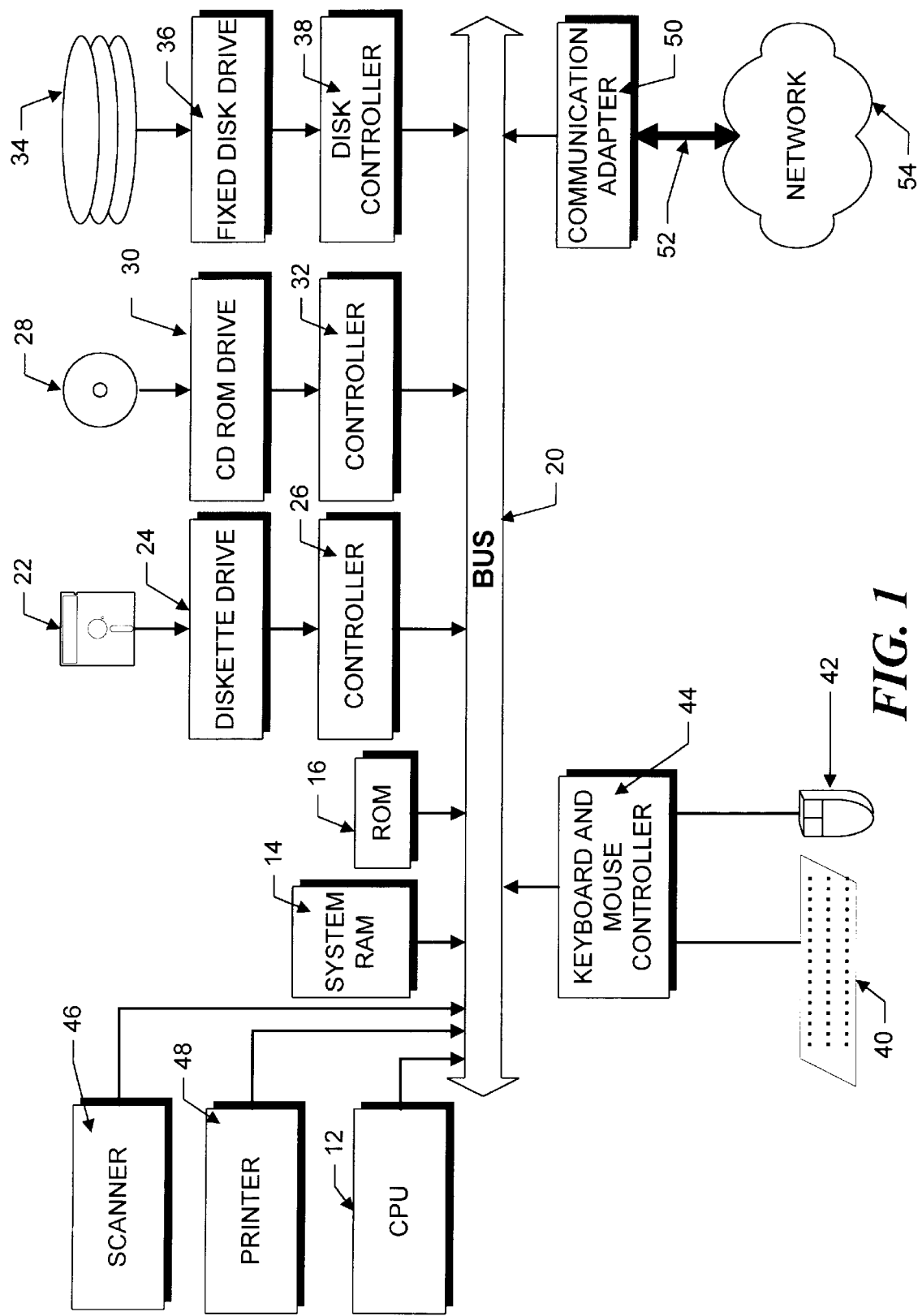
FIG. 1 is a block diagram of a computer system suitable for use with the present invention.

Referring now to FIG. 1, a computer system 10 on which the invention may be implemented is shown. Computer system 10 may be provided, for example, as an IBM compatible computer or an equivalent computer system. The exemplary computer system 10 of FIG. 1 is for descriptive purposes only. Although the description may refer to terms commonly used in describing particular computer systems, the description and concepts equally apply to other systems, including systems having architectures dissimilar to FIG. 1.

Computer system 10 includes a central processing unit (CPU) 12, which may be provided, for example, as a conventional microprocessor, a random access memory (RAM) 14 for temporary storage of information, and a read only memory (ROM) 16 for permanent storage of information. Each of the aforementioned components are coupled to a bus 20. Operation of computer system 10 is generally controlled and coordinated by operating system software. The operating system controls allocation of system resources and performs tasks such as processing, scheduling, memory management, networking, and I/O services, among things. Thus, an operating system resident in system memory and running on CPU 12 coordinates the operation of the other elements of computer system 10.

Also coupled to bus 20 is a non-volatile mass storage device which may be provided as a diskette 22. Diskette 22 is insertable into a diskette drive 24 which is, in turn, coupled to bus 20 by a controller 26. Similarly, a compact disc (CD) ROM 28 is insertable into a CD ROM drive 30 which is, in turn, coupled to bus 20 by a controller 28. A hard disk 34 is typically provided as part of a fixed disk drive 36 which is coupled to bus 20 by a disk controller 38.

Data and software may be provided to and extracted from computer system 10 via removable storage media such as diskette 22 and CD ROM 28. For example, data values generated using techniques to be described below in conjunction with FIGS. 2–9 may be stored on storage media similar to media 22, 28. The data values may then be retrieved from the media 22, 28 by CPU 12 and utilized by CPU 12 to perform color printing of scanned images. Alternatively, CPU 12 may simply store such data values in ROM 16.

Alternatively still, computer software useful for calibrating color scanning and color printing peripherals may be stored on storage media similar to media 22, 28. Such computer software may be retrieved from media 22, 28 for immediate execution by CPU 12. CPU 12 may retrieve the computer software and subsequently store the software in RAM 14 or ROM 16 for later execution.

User input to computer system 10 may be provided by a number of devices. For example, a keyboard 40 and a mouse 42 are coupled to bus 20 by a controller 44. A scanner 46 which may be provided, for example, as a hand held scanner or a page scanner is coupled to bus 20. Scanner 46 is capable of scanning color images which may later be printed by a color printer 48 also coupled to the bus 20.

Whether the scanner 46 is hand held or a page scanner, the scanner 46 includes a light source, a light sensitive device such as an array of charge couple devices (CCD, array) and software controlled electronics which sequentially actuate the elements of the CCD array. Scanners having resolutions of 400 dpi and higher are available with up to two hundred and fifty levels of grey and twenty-four bits of color resolution available. Thus, scanners offer a wide variety of choices and performance capabilities and are powerful input devices when prepared data in visual form is to be entered into the computer system 10.

When an input image embodied in a hard copy medium such as paper or film is provided to the scanner 46, the scanner 46 converts the image into electrical signals. Such conversion is typically accomplished via movement of a light beam over a surface of the hard copy media having the image disposed thereon. The light beam may be moved over the surface either by hand or automatically and using the array of light sensitive devices convert the reflective light into electrical pulses which form the electrical signals. The electrical signals thus provided may be fed to a processor such as CPU 12.

It should be noted that scanner 46 may itself include a processor and memory to which the electrical signals may alternatively be provided. Alternatively still, printer 46 may include a memory and processor and thus the scanner signals may be provided directly to printer 46.

In system 10 the processor 12 provides the scanner signals to the printer 48 and the printer 48 prints the image. The scanner 46, processor 12 and printer 48 all transform the signal images using transfer functions as will be discussed below in conjunction with FIG. 2. Thus, with scanner 46 and printer 48 coupled as shown, computer system 10 can perform the same function as a copy machine capable of re-producing both color images and black and white images.

The scanner and printer transfer functions typically distort the color signals and preferably the transfer function implemented by processor 12 reverses the effects of the transfer functions of the scanner 48 and printer 48. Thus, it is desirable to implement a function via a processor such as CPU 12 which is the inverse of the scanner and printer transfer functions. Such implementation includes the storage of a calibration values in a memory of system 10. Such calibration values are computed in accordance with the techniques set forth below in conjunction with FIGS. 2–7.

As mentioned above, the printer color gamut is typically smaller than the scanner color gamut and this is particularly true in less expensive printers. Similarly, relatively inexpensive scanners typically have smaller color gamuts than relatively expensive scanners. However, since it is not possible to print colors which cannot be scanned, those colors outside the scanner color gamut can simply be ignored. Computer system 10 also includes a communications adaptor 50 which allows the system to be interconnected to a local area network (LAN) or a wide area network (WAN), schematically illustrated by bus 52 and network 54. Thus, data and computer program software can be transferred to and from computer system 10 via adapter 52, bus 52 and network 54.

Figure 2:
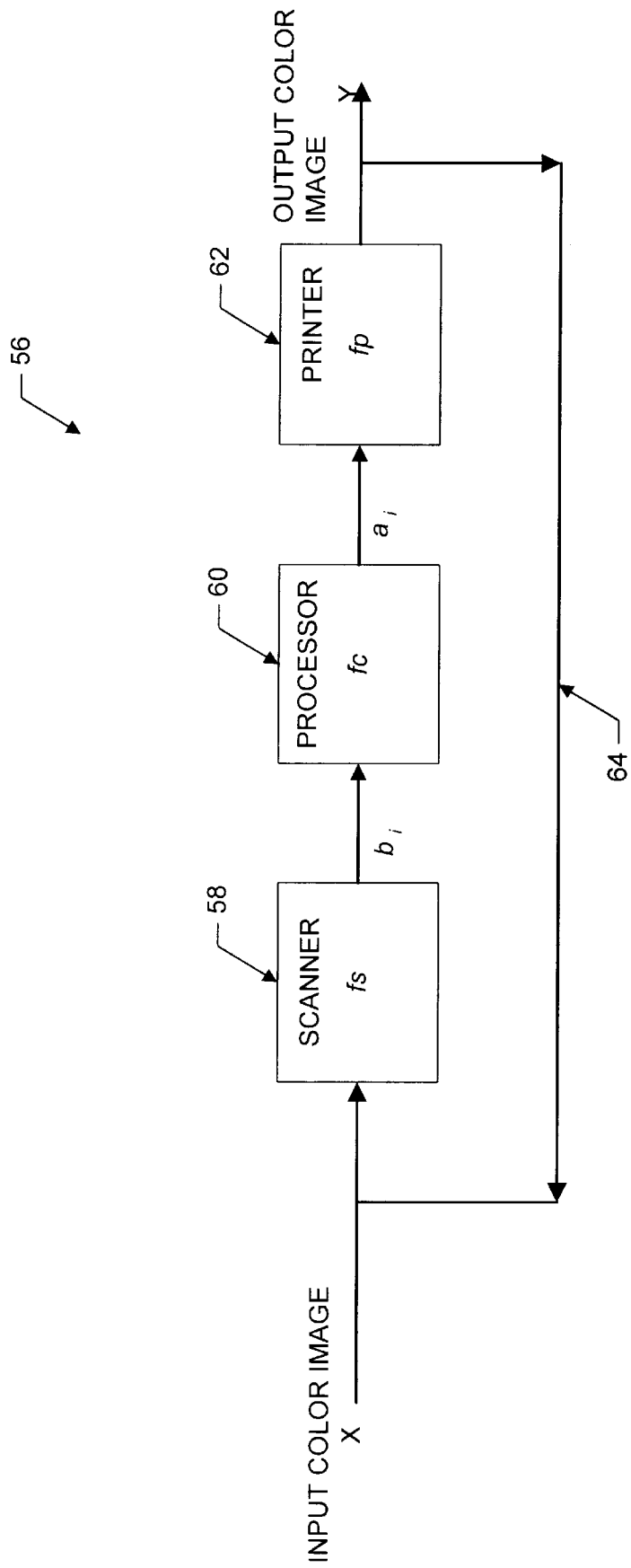
FIG. 2 is a block diagram of a closed color reproduction system.

Referring now to FIG. 2, a color reproduction system 56 includes a scanner 58 having a transfer function $f_s$, a processor 60 having a transfer function $f_c$ and a printer 62 having a transfer function $f_p$. An input color image is provided to the scanner 58 which converts the image into electrical signals which are fed to processor 60 which may be provided as CPU 12 (FIG. 1) or other data processing system. Processor 60 subsequently provides signals to printer 62. Printer 62 prints an output color image in response to the signals fed thereto from processor 60.

It is desirable for the system 56 to receive an image having an input color x and to provide at printer 62 an output image having a color identical to input color x. In practice, however, an image printed by printer 62 has an output color y which is different from input color x. Such differences in color are due among other things to the aforementioned differences between the color gamuts and the color device-dependency of the scanner 58 and printer 62.

The scanner, processor and printer transfer functions $f_s$, $f_c$ and $f_p$ are in general nonlinear and thus the output color y may be expressed as:

$$y = f_p \circ f_c \circ f_s(x)$$

in which the symbol 'O' denotes function composition.

If the scanner and printer transfer functions were invertible, for the input color X to match the output color y (i.e. x=y) the processor transformation $f_c$ should correspond to:

$$f_c = f_p^{-1} \circ f_s^{-1}$$

By coupling the output of printer 62 to the input of scanner 58 as indicated by signal path 64, reproduction system 56 is provided as a closed loop system. A closed-loop system refers to a system in which a particular scanner and a particular printer are coupled to form a scanner-printer pair. For example, scanner 58 may be provided as a reflection scanner which scans thermal color prints and printer 62 may be provided as a thermal color printer which produces thermal color prints. In a closed loop system, color calibration values for the scanner-printer pair are computed and stored in a memory as a color lookup table (LUT). The memory may be provided as part of the scanner 58, processor 60 or printer 62. The color lookup table allows colors scanned by scanner 58 to be reproduced relatively accurately by printer 62.

A plurality of different scanner-printer pairs may be formed using a plurality of different scanners and printers (e.g. using different model Epson scanners and Epson printers). Each of the printer-scanner pairs are provided having a unique color LUT.

If $a_i$ represents a vector used to generate a set of color patches printed by the printer 62 and these color patches are provided to the input of scanner 58 as indicated by path 64 then scanner 58 provides a set of scanner signals which may be denoted $b_i$. In this case, the following relationship exists:

$$b_i = f_s \cdot f_p(a_i)$$

Inverting this function yields the function $f_c$ to be implemented in the processor 60. During calibration, to provide a function $f_c$ which transforms the color signals $b_i$ into color signals $a_i$, relatively accurately, it would be desirable to generate a large set of color patches and scan using scanner 58. However, to reduce the amount of calibration time and conserve printer resources, typically relatively few color patches are printed and subsequently scanned. This results in a lookup table having relatively few values. When a desired image is provided to scanner 58, the scanner provides a scanned image which typically contain tens of thousands of pixels. Each of the pixel colors must be corrected by using the color calibration values stored in the memory. Due to the large number of pixels which must be color corrected, it is desirable to utilize a relatively fast technique for computing corrected color values using the function $f_c$. Tetrahedral interpolation is a relatively fast linear interpolation method for approximating three-dimensional functions from a sparse set of sample points.

One problem with this approach, however, is that for greater accuracy in approximating nonlinear functions such as $f_c$, linear interpolation techniques such as tetrahedral interpolation require a relatively large set of sample points. As discussed above, generation of a relatively large set of sample points requires a relatively large number of measurements. Thus, it is relatively time consuming and not practical to generate a large set of sample points by direct measurement.

For example, if five sample points are taken along each of three orthogonal axis of a cube in a sample space (i.e. 5×5×5 samples) the result is 125 color image patches. Each of the patches would then have to be scanned via scanner 58 into system 56 to produce sample points used to compute function $f_c$. If a linear interpolation technique were used to compute the function $f_c$ then to provide a relatively accurate estimate of the function $f_c$ it would be necessary to use more than 125 color image patches. For example, it may be desirable to sample seventeen points in each of three orthogonal directions (i.e. 17×17×17 samples) which results in 4,917 color image patches. These patches would have to be scanned into system 56 to produce sample points used to compute function $f_c$. Thus, it is not practical to sample the color gamuts in a relatively dense manner due to the computational cost and time requirements and printer resources necessary to produce sample points and compute the function $f_c$.

For relatively smooth functions, nonlinear interpolation methods generally provide better accuracy with fewer sample points than linear interpolation methods. Nonlinear interpolation methods, however, are computationally expensive. Thus, in accordance with the present invention, a relatively small number of measured sample points are generated and a nonlinear interpolation method is used to compute an approximation to the function $f_c$.

The approximated function $f_c$ is then used to generate an augmented set of sample points which are similar to the sample points which could be provided by scanning more than 125 image patches into system 56, for example. The augmented set is used to construct a LUT mapping the input to the output, using an iterative nonlinear interpolation based scheme. This LUT contains input and output mapping values for a fine sampling of the input color space. A fast linear interpolator is used in conjunction with this LUT to generate output colors corresponding to input colors.

Figure 2A:
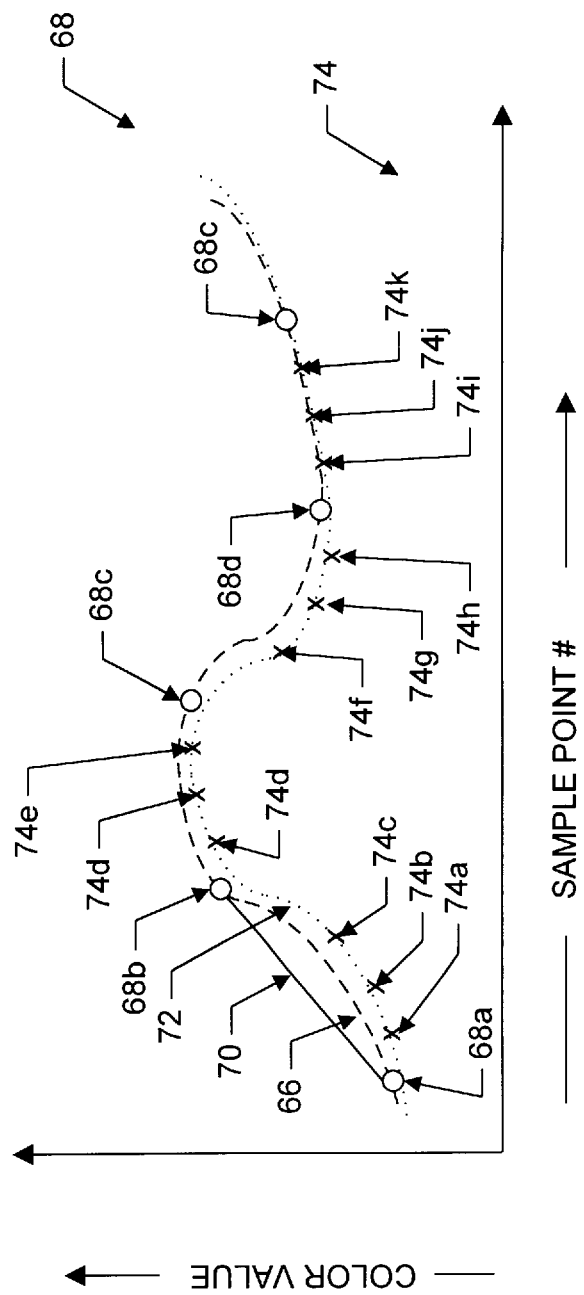
FIG. 2A is a plot of measured and sampled color values.

Referring now to FIG. 2A, an original data sequence is represented as a continuous function 66 (illustrated as a dashed line). It should be noted that FIG. 2A explains certain concepts using one-dimensional example. Those of ordinary skill in the art will appreciate of course that these concepts apply equally to three-dimensional or N-dimensional cases and that the one-dimensional case shown in FIG. 2A is merely used due to ease of explanation and clarity.

As shown in FIG. 2A, the original data sequence has been sampled at a first predetermined resolution to generate a plurality of measured sample points 68a–68e generally denoted 68. The measured sample points 68a–68e are generated by printing out predetermined image patches and scanning the image patches as described above. Thus, in this particular example five measured sample points 68a–68e generally referred to as measured sample points 68 are shown.

A linear interpolation between the first two measured sample points 68a, 68b results in a function 70 (illustrated as a solid line) which is an approximation to function 66. It should be noted that for clarity only a portion of function 70 is here shown. Since function 66 is a nonlinear function, there exists a relatively large difference between original continuous nonlinear function 66 and the linear function 70 generated using linear interpolation between the points 68a, 68b.

A second approximation 72 to original function 66 may be provided by using a nonlinear interpolation technique (illustrated as a dotted line). The nonlinear interpolation technique is able to approximate nonlinear function 66 more closely than a linear interpolation technique. Since the nonlinear function 72 is a closer approximation to original nonlinear function 66 than is linear function 70, if approximated nonlinear function 72 is re-sampled at a resolution higher than the resolution used to generated measured sample points 68.

Sampling at a higher resolution provides an augmented set of sample points which includes sample points 74a–74k generally denoted 74 having values which approximate the values of the points 68 which lie on continuous function 66. Thus, an augmented set of sample points 74 are provided without the need to generate additional measured data points by printing out and scanning image patches. Thus, while measured sample points 68a–68e are generated using the image patches described above, the augmented set of sample points 74 are generated by interpolating between measured sample points 68 with a nonlinear interpolation method and subsequently re-sampling the resulting approximation at a resolution greater than that used to generate measured sample points 68. This technique thus results in more points being available for use in a subsequent linear interpolation thereby increasing the accuracy of the results provided by linear interpolation techniques.

Figure 3:
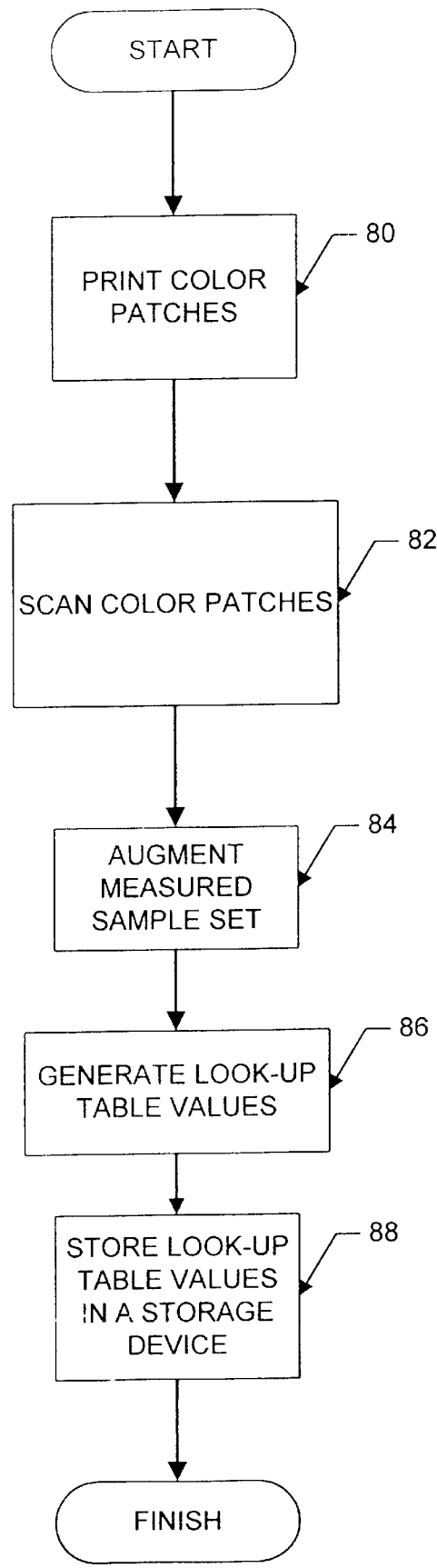
FIG. 3 is a flow diagram illustrating the steps performed by a processor to provide a color lookup table.
Figure 5:
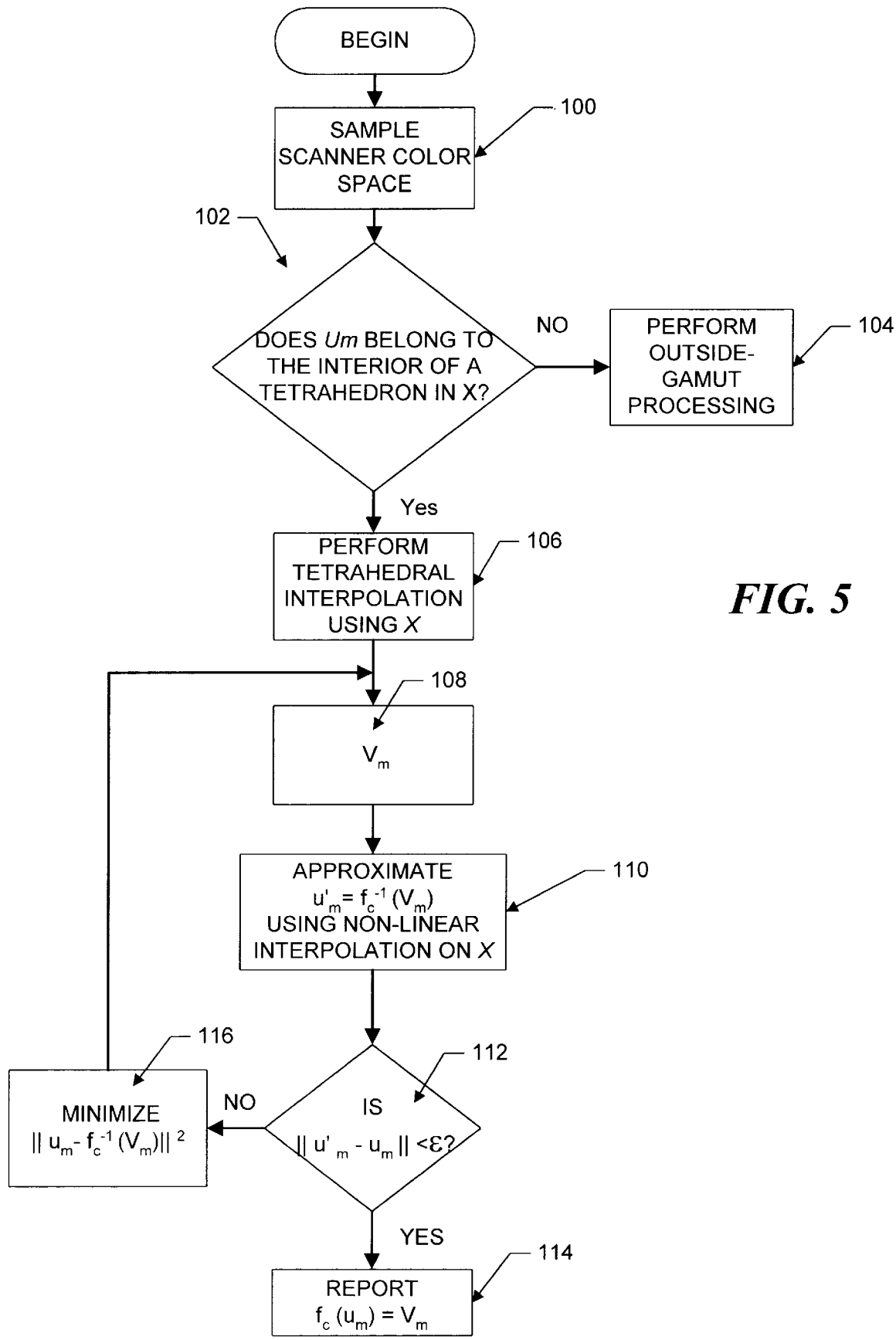
FIG. 5 is a flow diagram illustrating the steps performed by a processor to provide a color lookup table.

FIGS. 3 and 5 are a series of flow diagrams showing the processing performed by apparatus 10 (FIG. 1) to perform a color calibration. The rectangular elements (typified by element 80), herein denoted "processing blocks," represent computer software instructions or groups of instructions. The diamond shaped elements (typified by element 102, FIG. 5), herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagram does not depict syntax of any particular programming language. Rather, the flow diagram illustrates the functional information one skilled in the art requires to fabricate circuits or to generate computer software to perform the processing required of apparatus 10. It should be noted that many routine program elements, such as initialization of loops and variables and the use of temporary variables are not shown.

Turning now to FIG. 3, as shown in step 80, a plurality of color patches are printed by a printer. The color patches correspond to uniformly sampled color coordinates in an output device color space. Next, as shown in step 82, the color patches are scanned by a scanner to obtain corresponding color coordinates in an input device color space. Processing then proceeds to processing block 84 where an augmented measured sample set is generated by performing a nonlinear interpolation between the measured values to add more samples to the measured set of sampled values provided by scanning the color patches in step 82.

Next, as shown in step 86, for each color $u_m$ in the input device color space for which a lookup table entry is desired, a corresponding output device color value $v_m$ is generated using the method described below in conjunction with FIG. 5.

Processing then flows to step 88 where an output device color value $v_m$ is stored for each color in the input device color space for which a lookup table entry is desired. The pairs $(u_m, v_m)$ are stored in the storage to be used later to map input color coordinates to output color coordinates.

It should be noted that since the augmented sample points are generated via a nonlinear interpolation technique, the technique of the present invention avoids the necessity of physically printing a large number of color patches in step 80 to generate the values stored in the storage device as shown in step 88. Thus, the effective number of patches used to generate a lookup table is increased even though the patches are not physically printed by the printer.

In one application a lookup table having the color values are pre-computed, e.g. by a computer manufacturer or a peripheral manufacturer and stored in a memory. In such an application, 9×9×9 measured values are used and the nonlinear interpolation method used is a cubic B-spline. The number of supplemental sample points corresponds to 4913 points which is the number of points which would be generated by printing and scanning 4913 color image patches.

In a second application, the technique of the present invention can be implemented on a home PC or other processing device having a color scanner and a color printer coupled thereto. In this case a user of the PC scans in a predetermined number of patches (e.g. 125 color image patches printed by the printer) and the PC computes the color values for the lookup table in accordance with steps 82–86. In this case the number of re-sampled points in step 86 corresponds to 729 points (9×9×9 color image patches). Thus, using the techniques of the present invention, the user need not scan in a large number of patches, rather the user need only print out one page of color patches and a 3-D cubic spline interpolation will be used to generate the additional sample points. The total set of sample points (both the originally sampled points and the supplemental points) are then sampled at a higher resolution for use in subsequent linear interpolations methods performed when color images are printed by a printer.

Figure 4:
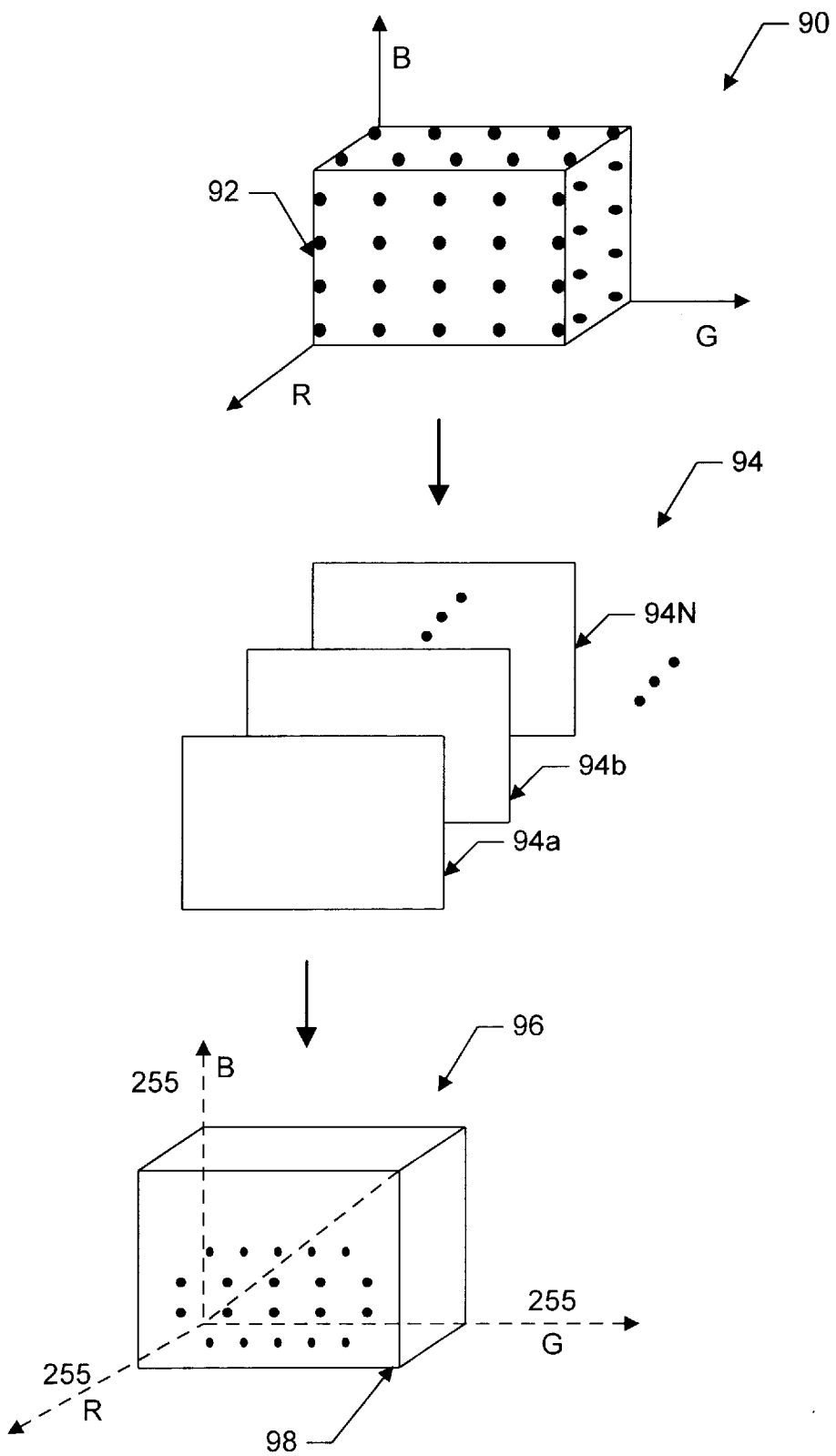
FIG. 4 is a plot of the distribution of the printed color signals used to generate color patches in a printer color space and a resulting distribution of scanner color signals in a scanner space.

Referring now to FIG. 4, a plot of a color cube 90 in an RGB color space used to generate color patches 94a–94N generally denoted 94 is shown. For example 125 color image patches 94 may be provided by selecting 5×5×5 uniformly spaced samples from color cube 90 which fall along the R, G and B axis of the RGB color space. The color patches 94 which are printed by a printer thus correspond to data points 92 which are provided from a uniform sampling of the RGB color cube along the R, G, and B axis.

Letting the number of sample points 92 along each axis be N, these sampled points 92 correspond to the colors $a_i$ discussed above in conjunction with FIG. 2. Assuming an 8 bit representation is used for each R, G and B value then the color signals $a_i$ may be represented as:

$$a_i = \begin{pmatrix} r_i \\ g_i \\ b_i \end{pmatrix}_a = \frac{255}{N-1} \begin{pmatrix} p \\ q \\ r \end{pmatrix}$$

in which
the subscript "a" denotes that the R, G, B values are in the printer's device coordinate space;
$i = 0, 1, \ldots, N^3 - 1$; and
$p, q, r, \in \{0, 1, \ldots, N-1\}$ and satisfy the constraint that $i = pN^2 + qN + r$ Next, the printed color patches 94 are scanned by a scanner to provide the distribution of scanner color signals 98 in scanner color space 96. The scanner color signals 98 generated by scanning the printed patches 94 correspond to the color signals $b_i$ referred to above in conjunction with FIG. 2. These colors are in the scanner R, G, B coordinates, and thus may be represented as:

$$b_i = \begin{pmatrix} r_i \\ g_i \\ b_i \end{pmatrix}_b$$

in which
the subscript "b" denotes that the R, G, B values are in the scanner is device coordinate space; and
$i = 0, 1, \ldots, N^3 - 1$.
In this manner, samples of the function $f_c^{-1}$ have been measured as:

$$f_c^{-1}(a_i) = b_i$$

where $i = 0, 1, \ldots N^3 - 1$.
Inverting the function $f_c^{-1}$ yields the desired function $f_c$ to be implemented in a computer or other processing device.
If the set of measured data values 92 is denoted as X, then X may be expressed as:

$$X = (a_i, b_i)$$

for $i = 0, \ldots, N^3 - 1$
The construction of the set of sample points for approximating the function $f_c$ are described in conjunction with FIG. 5.

Referring now to FIG. 5, the construction of a set of sample points for approximating the function $f_c$ includes the step of uniformly sampling a scanner color space (e.g. an RGB color space) to obtain $M^3$ samples, where M>N. These sampled points may be denoted as $u_m$, where m=0, 1, . . . , $M^3$–1. This may be expressed in matrix form as:

$$u_m = \begin{pmatrix} r_m \\ g_m \\ b_m \end{pmatrix}_b = \frac{255}{M-1} \begin{pmatrix} i \\ j \\ k \end{pmatrix}$$

In which:

m=0, 1, . . . , $M^3$–1; and i, j, k belongs to the set of {0, 1, . . . , m–1} and satisfies the constraint:

$$m = iM^2 + jM + k.$$

Next it is necessary to determine $f_c(u_m)$ for m=0, . . . , $M^3$–1.

The estimation of $f_c(u_m)$, m=0, . . . , $M^3$–1 proceeds by a process of estimation and refinement as described in steps 108–114 below. The estimate of $f_c(u_m)$ is denoted as $V_m$.

In step 102, a decision is made as to whether the sampled points $u_m$ are contained within a volume of a tetrahedron formed by predetermined ones of the set of measured values X. If decision is made that the sampled point $u_m$ is not contained in any such tetrahedron, the processing flows to step 104 where an outside gamut processing routine is performed. The set of $u_m$ that do not belong to the interior of any tetrahedron in X, belongs to the region of the scanner color gamut $G_s$ outside the printer color gamut $G_p$ (i.e. those colors in the region $G_s$–$G_p$). To compute the estimate of $f_c(u_m)$ for these points outside the printer color gamut, the following steps may be performed.

First, letting V denote the volume composed by the union of all the tetrahedra formed by the set of measured values X and letting S denote a surface of the volume V, the sampled points $U_m$ may be expressed as:

$$u_m = \begin{pmatrix} r_m \\ g_m \\ b_m \end{pmatrix}_b$$

Next, a first line is drawn from $$\begin{pmatrix} r_m \\ g_m \\ b_m \end{pmatrix}_a$$

to $$\frac{1}{3} \begin{pmatrix} r_m + g_m + b_m \\ r_m + g_m + b_m \\ r_m + g_m + b_m \end{pmatrix}_a$$

Next letting $W_m$ denote the intersection of this first line with the volume V, then the value $f_c(W_m)$ may be used as the estimate for $f_c(u_m)$. If the first line does not intersect the volume V, then a point $W_m$ on S that is closest to $u_m$ is assigned. In this case, $f_c(W_m)$ is used as an estimate for $f_c(u_m)$ and processing ends.

However, if in decision step 102 it is determined that the value $u_m$ falls within a volume of a tetrahedron formed from the set of measured values X, then processing flows to step 106 where a tetrahedral interpolation is performed to provide a first estimate $V_m$ as shown in step 108.

Performing a linear interpolation such as a tetrahedral interpolation in step 106 increases the speed with which a relatively close approximate function is achieved and also assures convergence in generating the approximate function. Processing then continues to step 110 where an approximation $u'_m$ of the sampled value $u_m$ is computed by performing a nonlinear interpolation using the measured values X.

Processing then continues to decision block 112 where a norm between the approximated values $u'_m$ and the sampled values $u_m$ is computed and compared to a predetermined error value $\epsilon$. The particular error value $\epsilon$ is selected in accordance with a variety of factors including but not limited to the number of bits used to represent each R, G, B color. For example, if each R, G, B color is represented by 8 bits then $\epsilon$ would be provided a value which is not less than a value represented by a least significant bit. The norm may be computed using any distance function well known to those of ordinary skill in the art including but not limited to using the Euclidean distance between the vectors $u'_m$ and $u_m$ or by computing the maximum difference between any components of the vectors $u'_m$ and $u_m$. If in decision block 112 the computed norm is less than the error value $\epsilon$, then the approximate value processing continues to step 114 where the estimate of $f_c(u_m)$ is reported.

If on the other hand, in decision block 112, it is determined that the computed norm is greater than the predetermined error value $\epsilon$ then processing continues to step 116 where the norm between the sampled values $u_m$ and the estimated value provided by the inverse of the estimated function is minimized. Processing then flows to steps 108–112 until the norm between the estimated values $u'_m$ and the sampled values $u_m$ can no longer be minimized. Thus, steps 108, 110, 112 and 116 form a loop to minimize the error between the estimated values and the measured values. This insures that the function $V_m$ identified in step 114 is as close as possible to the original function underlying the measured data values were sampled.

It should be noted that in step 116 any technique may be used to minimize the difference between the measured values and the estimated values. For example, the minimization may be accomplished using a direction set method such as Powell's method or a gradient descent method such as a stochastic gradient descent.

It should also be noted that in step 110 the set of measured values X are interpolated to estimate $f_c^{-1}$ using a nonlinear interpolation method such as a cubic B-spline. A computationally less expensive method is to use cubic splines for 3-D Interpolation. Other nonlinear interpolation techniques may also be used.

It should further be noted that the search steps described above converge since in practice, the function being minimized is convex in the neighborhood of the starting point specified by the initial guess supplied by the tetrahedral Interpolation in step 106. Thus step 106 provides a good starting point for performing the nonlinear interpolation and also increases the speed with which the approximate function is provided. Other techniques including nonlinear interpolation techniques may also be used to provide the initial starting point, however, using the tetrahedral interpolation results in a relatively rapid generation of the approximate function $f_c(u_m)$.

Figure 6:
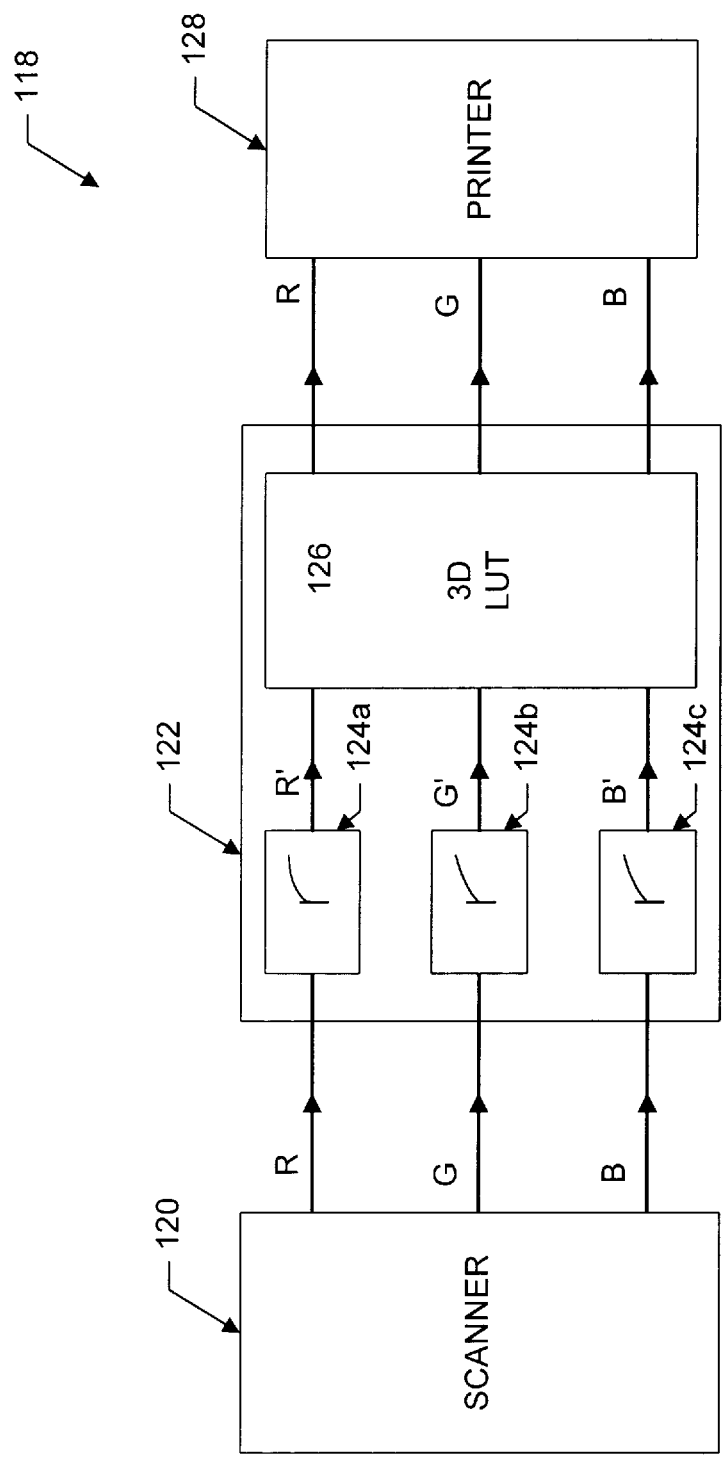
FIG. 6 is a block diagram of a color reproduction system.

Referring now to FIG. 6, a color reproduction system 118 includes a scanner 120 a lookup table 122 and a printer 128. Since the scanner RGB values are obtained by the same physical sensor with different color filters, it is possible to preprocess all three color channels to correct for sensor nonlinearity. To determine this correction, the printed grey values are compared against scanned grey values for neutral colors (R=G=B).

In order to provide relatively good performance for neutral colors, it would be desirable for the grey line to be as straight as possible such that when interpolating between two points along the grey line the interpolated points still lie along the grey line. In practice, however, because of the nonlinearities of devices such as color printers and color scanners, the grey line is not linear.

Figure 7:
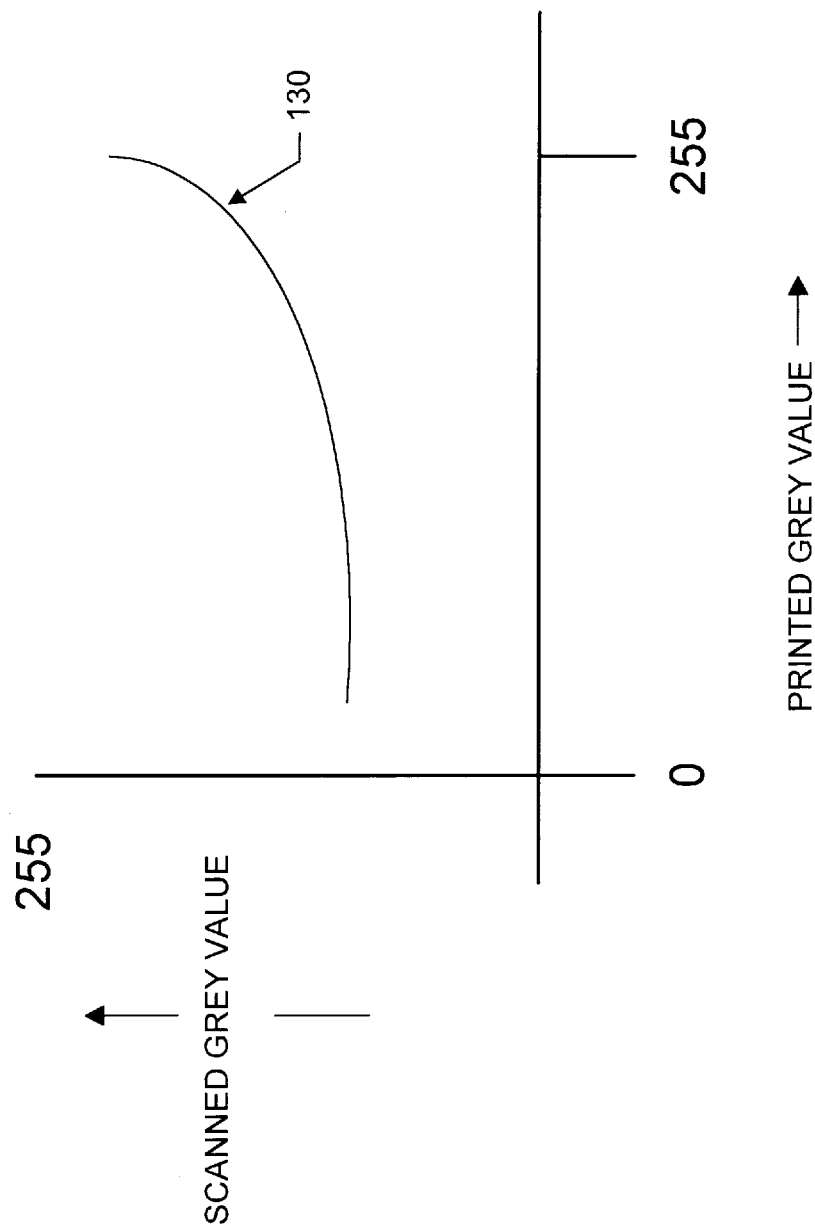
FIG. 7 is a plot of scanned grey values versus printed grey values.

Referring briefly to FIG. 7, a plot showing the relationship between the printed gray values and the scanned gray values for neutral colors (R=G=B) is shown. Ideally the gray line would have a constant slope however, because of the above mentioned nonlinear responses printers and scanners, this is not generally true. The curved line illustrated in FIG. 7 indicates that the printed colors would have an undesirable hue (e.g. a blue hue or a red hue, etc . . . .) It should be noted that the gray line function must be generated for each individual scanner-printer pair. The function illustrated in FIG. 7 may be inverted and applied to all input channels R, G and B before being input to the color mapping stage.

Referring again to FIG. 6, the scanner R, G, B values are individually passed through respective ones of one-dimensional lookup tables 124a–124c which implement the inverted function of FIG. 7 to provide signals R', G', B'. Tables 124a–124c thus preserve the linearity near the gray areas. Humans are sensitive to hues for neutral tones. It should be noted that the information required to generate the gray line shown in FIG. 7 is available since all the points in the color cube have already been measured. A subset of the color points which have been measured include some values in which R=G=B. Thus, from these values a gray line as shown in FIG. 7 may be computed.

The transformed signals R', G', B' are subsequently provided to a three-dimensional lookup table 126 formed using the techniques described above in conjunction with FIGS. 2–5 and the final output signals R, G, B, are provided to printer 128.

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of calibrating a color reproduction system including scanner and printer units defining dissimilar scanner and printer gamuts respectively, the method comprising the steps of:

(A) providing a plurality of color patches;

(B) scanning the plurality of color patches through the scanner unit to generate a plurality of measured color values collectively defining a first color transfer function between the scanner and printer gamuts;

(C) sampling a color cube within the scanner gamut to generate a plurality of sampled scanner color values;

(D) selecting predetermined ones of the sampled scanner color values which are defined within the printer gamut;

(E) for each one of the selected sampled scanner color values, performing the steps of:

(1) linearly interpolating the measured color values to obtain an initial color value within the printer gamut corresponding to a given one of the selected sampled scanner color values; and (2) recursively refining the initial color value using nonlinear interpolation of the measured color values until an optimal color value within the printer gamut is obtained; and (F) generating a second color transfer function approximating the first transfer function based on the measured, sampled scanner, and optimal color values.

2. The method of claim 1, wherein said refining step (E) (2) comprises the steps of:

(a) nonlinearly interpolating the measured color values to obtain an estimated color value within the scanner gamut corresponding to the initial color value within the printer gamut;

(b) computing a difference value between the estimated color value and the given selected sampled scanner color value;

(c) comparing the difference value to an error value;

(d) in response to the difference value exceeding the error value, minimizing a difference between the estimated color value and the given selected sampled scanner color value to obtain a revised initial color value within the printer gamut;

(e) repeating steps (a) through (d) while the difference value exceeds the error value; and (f) setting one of the initial and revised initial color values as the optimal color value corresponding to the given selected sampled scanner color value when the difference value fails to exceed the error value.

3. The method of claim 2, wherein said minimizing step (E)(2)(d) comprises the step of optimizing the difference between the estimated color value and the given selected sampled scanner color value using a first one of a direction set method and a gradient descent technique.

4. The method of claim 1, wherein said providing step (A) comprises the step of printing the plurality of color patches with the printer unit.

5. The method of claim 1, wherein each one of the measured color values correspond to color values common to a color cube of the printer unit and a color cube of the scanner unit.

6. The method of claim 1, wherein said generating step (F) comprises the step of building a lookup table including corresponding pairs of the measured colors within the printer and scanner gamuts and corresponding pairs of the selected scanner color values and optimal color values within the printer gamut.

7. The method of claim 1, wherein said generating step (F) comprises the steps of:

(1) building a lookup table, each lookup table entry including corresponding pairs of the measured colors within the printer and scanner gamuts and corresponding pairs of the selected scanner color values and optimal color values within the printer gamut; and (2) storing the lookup table within a memory.

8. The method of claim 1, wherein in response to the printer unit receiving a print signal, the method further comprises the steps of:
- (G) retrieving plural lookup table entries adjacent color data specified in the received print signal; and
- (F) linearly interpolating among the adjacent lookup table entries to provide a color printer signal.

9. The method of claim 1, wherein said sampling step (C) comprises the step of uniformly sampling the scanner color cube along orthogonal axes extending from a vertex of the scanner color cube.

10. The method of claim 1, wherein nonlinear interpolation is provided as a first one of:
- a combination of three-one dimensional cubic splines; and
- a cubic B-spline.

11. A computer program product for use with a color reproduction system including a processor, a scanner in communication with said processor and defining a scanner gamut, and a printer in communication with said processor defining a printer gamut dissimilar from the scanner gamut, the product comprising:
- a computer useable medium having computer readable program code for providing a plurality of color patches;
- a computer useable medium having computer readable program code for scanning the plurality of color patches through the scanner to generate a plurality of measured color values collectively defining a first color transfer function between the scanner and printer gamuts;
- a computer useable medium having computer readable program code for sampling a color cube within the scanner gamut to generate a plurality of sampled scanner color values;
- a computer useable medium having computer readable program code for selecting predetermined ones of the sampled scanner color values which are defined within the printer gamut;
- a computer useable medium having computer readable program code for linearly interpolating the measured color values to obtain an initial color value within the printer gamut corresponding to a given one of the selected sampled scanner color values; and
- a computer useable medium having computer readable program code for recursively refining the initial color value using nonlinear interpolation of the measured color values until an optimal color value within the printer gamut is obtained; and
- a computer useable medium having computer readable program code for generating a second color transfer function approximating the first transfer function based on the measured, sampled scanner, and optimal color values.

12. The computer program product of claim 11, wherein said computer useable medium having computer readable program code for recursively refining the initial color value comprises:
- computer readable program code for nonlinearly interpolating the measured color values to obtain an estimated color value within the scanner gamut corresponding to the initial color value within the printer gamut;
- computer readable program code for computing a difference value between the estimated color value and the given selected sampled scanner color value;
- computer readable program code for comparing the difference value to an error value;
- computer readable program code for, in response to the difference value exceeding the error value, minimizing a difference between the estimated color value and the given selected sampled scanner color value to obtain a revised initial color value within the printer gamut; and
- computer readable program code for setting one of the initial and revised initial color values as the optimal color value corresponding to the given selected sampled scanner color value when the difference value fails to exceed the error value.

13. The computer program product of claim 11, wherein each one of the measured color values correspond to color values common to a color cube of the printer unit and a color cube of the scanner unit.

14. The computer program product of claim 11, wherein said computer useable medium having computer readable program code for generating a second color transfer function comprises computer readable program code for building a lookup table including corresponding pairs of the measured colors within the printer and scanner gamuts and corresponding pairs of the selected scanner color values and optimal color values within the printer gamut.

15. The computer program product of claim 11, wherein said computer useable medium having computer readable program code for generating a second color transfer function comprises:
- computer readable program code for building a lookup table, each lookup table entry including corresponding pairs of the measured colors within the printer and scanner gamuts and corresponding pairs of the selected scanner color values and optimal color values within the printer gamut; and
- computer readable program code for storing the lookup table within a memory in communication with the processor.

* * * * *